United States Patent

[11] 3,600,692

| [72] | Inventor | John K. McGee<br>Houston, Tex. |
|---|---|---|
| [21] | Appl. No. | 871,195 |
| [22] | Filed | Oct. 17, 1969 |
| [23] | | Division of Ser. No. 555,048, June 3, 1966,<br>Pat. No. 3,539,895. |
| [45] | Patented | Aug. 17, 1971 |
| [73] | Assignee | Giddings & Lewis Machine Tool Company<br>Fond du Lac, Wis. |

[54] PHASE COMPARATOR PROVIDING DC OUTPUT AS A FUNCTION OF VARIABLE PHASE BETWEEN TWO INPUTS
4 Claims, 4 Drawing Figs.

[52] U.S. Cl. ......................................................... 328/134,
328/155, 328/110
[51] Int. Cl. ........................................................ H03b 3/04

[50] Field of Search ................................................ 328/109,
110, 133, 134, 155

[56] References Cited
UNITED STATES PATENTS

| 3,024,420 | 3/1962 | Martin | 328/110 X |
|---|---|---|---|
| 3,200,340 | 8/1965 | Dunne | 328/110 X |
| 3,509,454 | 4/1970 | Gossel | 328/134 X |

Primary Examiner—John S. Heyman
Attorney—Wolfe, Hubbard, Leydig, Voit and Osann

ABSTRACT: A phase discriminator for producing a DC voltage which varies in magnitude and polarity according to the sense and extent of the phase displacement between two recurring signals which may vary in phase relation to one another. The first signal may, for example, be a train of pulses and the second signal may be a recurring sinusoidal wave. A tristate DC signal producing circuit is controlled by the two signals and its output is supplied to an averaging filter.

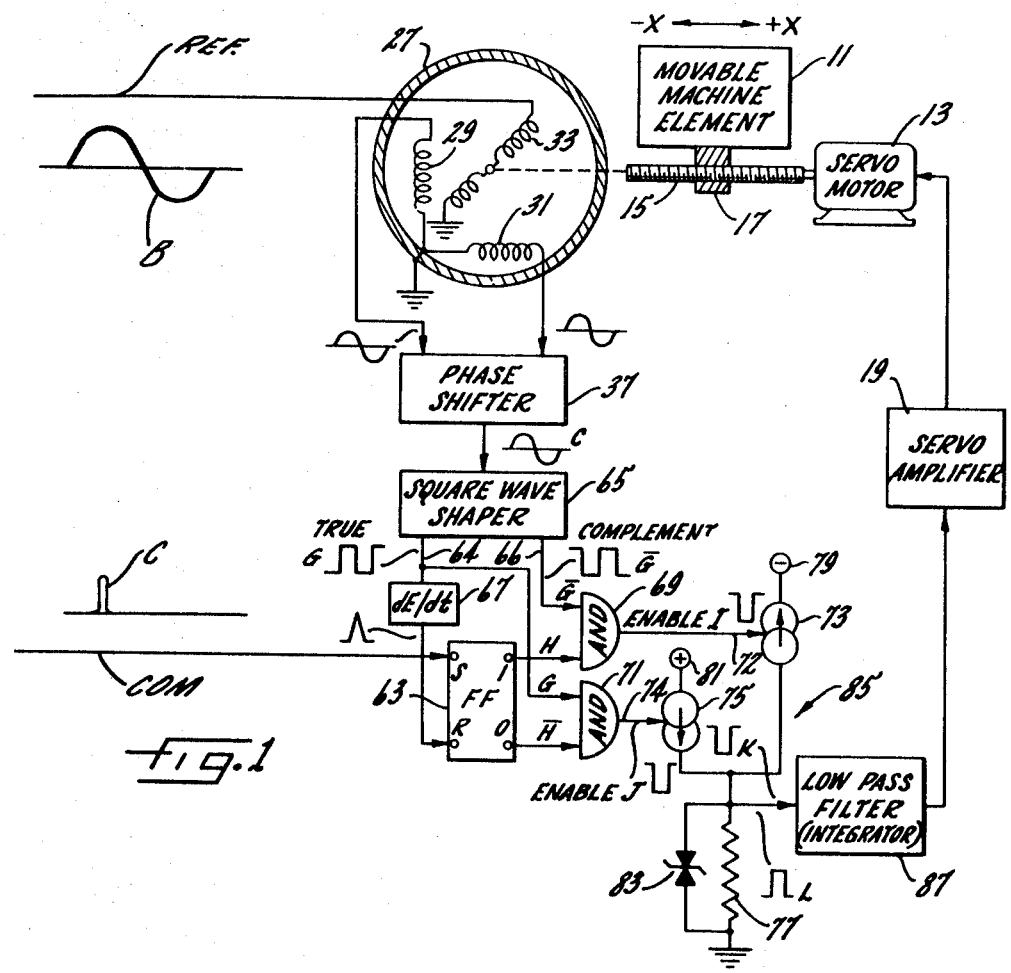

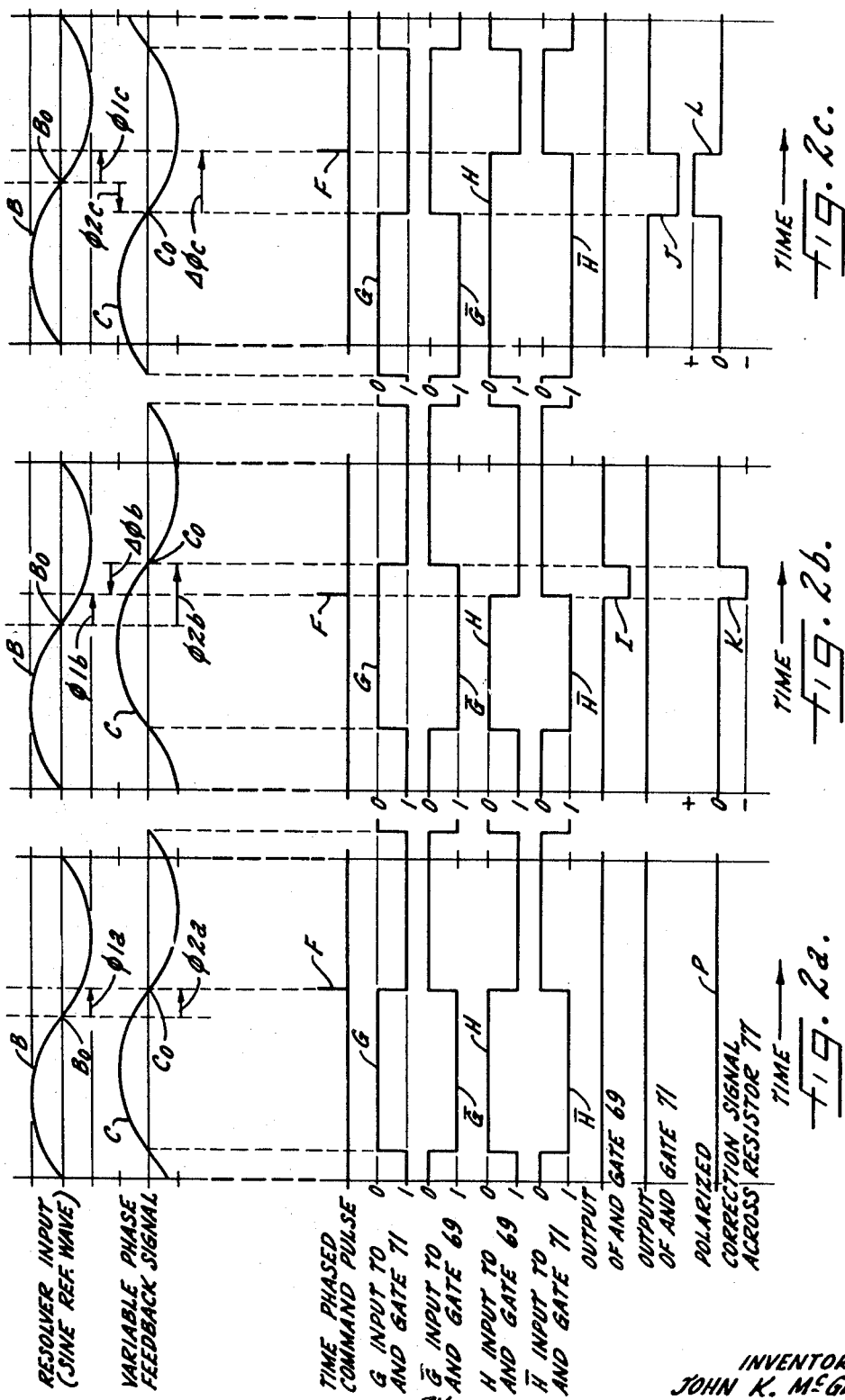

PHASE COMPARATOR PROVIDING DC OUTPUT AS A FUNCTION OF VARIABLE PHASE BETWEEN TWO INPUTS

CROSS-REFERENCE TO RELATED APPLICATION

This is a division of applicant's copending application Ser. No. 555,048 filed June 3, 1966, now U.S. Pat. No. 3,539,895.

BRIEF SUMMARY OF THE INVENTION

The present invention relates in general to signal conversion circuitry, and in particular to apparatus for converting the variable phase between two recurring electrical signals into a DC signal of corresponding magnitude and polarity. Although not limited in its utility, the invention finds especially advantageous use in numerical control systems for controlling the extents and velocities of movement of movable members, such as machine tool elements, as described in the above-identified parent application Ser. No. 555,048.

It is the general aim of the invention to provide a simple and yet accurate phase comparator or discriminator which is immune from drift or aging.

More specifically, it is an object to provide a phase discriminator which in its essential parts constitutes a tristate device which at any instant produces either (a) no error signal when the phase error is zero, (b) a positive error signal of fixed magnitude when the phase error is lagging, (c) a negative error signal of fixed magnitude when the phase error is leading. Because the error signal is time or width modulated according to the magnitude of the phase error, its application to an averaging results in a final DC signal which is proportional in magnitude to, and agreeable in polarity with, the size and sense of the phase variation of two recurring input signals.

Still another object is to realize a phase discriminator with the foregoing characteristics which is principally formed by conventional and regularly available elements such as flip-flops, AND gates and constant current generators which are known to be trouble-free and relatively immune from drift or other malfunctions.

Other objects and advantages will become apparent as the following description proceeds, taken in conjunction with the accompanying drawings, in which

BRIEF DESCRIPTION OF THE DRAWINGS

FIG. 1 is a diagrammatic block and line illustration of a servocontrol system which includes a phase discriminator embodying the features of the present invention; and FIGS 2a, b and c illustrate the time relationships of signals in the system under three different conditions.

While the invention has been shown and will be described in some detail with reference to a preferred embodiment thereof, there is no intention that it thus be limited to such detail. On the contrary, it is intended to cover here all modifications, alternatives, and equivalents falling within the spirit and scope of the invention as defined by the appended claims.

DETAILED DESCRIPTION

As illustrated in FIG. 1, a phase discriminator embodying the invention is associated with a servomechanism for translating a movable element according to the changes in phase between a sinusoidal reference wave appearing on a conductor Ref and a recurring command signal appearing on a conductor Com. The movable element 11 is translated through distances and at velocities corresponding respectively to the extent and rate of change in the phase angle between the reference and command signals by appropriate energization of a reversible servomotor 13 connected to turn a lead screw 15. Engaged with the lead screw and fixed to the element 11 is a nut 17. The element 11 is moved in a −x or +x direction (toward the left or toward the right in FIG. 1) and at speeds corresponding to the magnitude and polarity of a DC voltage applied to the servomotor 13 by a servoamplifier 19. The manner in which the final DC signal for driving the servoamplifier 19 is derived forms an important part of the invention and will be described hereinafter.

In carrying out the invention, a comparison is made between the instantaneous position of the movable element 11 and the command signal representing the directed, instantaneous, and dynamically changing position of the element. Based on this comparison the final DC error signal is produced whose sense and magnitude correspond to the sign and extent of the error which exists between the instantaneous directed and actual positions of the element.

In this manner, the velocity of the element is made to correspond to the rate of change in the commanded or directed instantaneous position.

Provision is made to generate a feedback signal whose phase relative to a reference signal is indicative of the actual instantaneous position of the movable machine element 11. The sinusoidal reference signal may be supplied to the conductor Ref from any suitable source (not shown), and the reader is referred to applicant's above-identified parent application for details of one exemplary source. It may be assumed merely for the sake of discussion that the reference sine wave has a recurrence frequency of 500 cycles per second, and that wave is illustrated at B in FIGS. 2a—c.

To provide an indication of the actual instantaneous position of the movable element 11, means are provided for producing a recurring feedback signal which is indicative by the sense and magnitude of its phase angle, relative to the reference signal B, of the sign and extent of the displacement of the movable element from a datum position. Synchronous induction devices having two relatively movable parts are particularly suitable for this purpose. Many such induction devices are known and may take the form of rotary synchronous resolvers or linear "Inductosyn" scales. In either case the synchronous induction device includes one or more input windings excited with one or more sinusoidal voltages and has inductively coupled output windings or conductors which produce output voltages varying in phase or amplitude as a function of the relative positions of two movable parts. For purpose of illustration, the synchronous induction device is here shown as a resolver 27 having a stator with a pair of stator windings 29 and 31, and a rotor carrying a rotor winding 33. The resolver rotor is mechanically coupled through suitable gearing (not shown) to the lead screw 15 so that as the latter is turned by the servomotor 13, the resolver rotor turns with it. As a specific example, the resolver rotor may be geared to the lead screw 15 so that it makes one revolution for each 0.1 inch of travel by the movable element 11.

The resolver 27 is excited by the sinusoidal reference signal B fed to its rotor winding 33. The resulting pulsating magnetic field induces a pair of sinusoidal signals in the stator windings 29 and 31 with the amplitude of the output signals varying as sine and cosine functions of the angular position of the stator windings with respect to the rotor winding 33.

By means of a phase shifter 37 the variable amplitude sinusoidal signals appearing across the resolver stator windings 29 and 31 are converted into a single sinusoidal signal C which is of constant amplitude but whose phase relative to that of the sinusoidal reference signal B shifts 360° with each complete rotation of the resolver rotor. Such phase shifters are well known in the art, a suitable example being disclosed in Fitzner U.S. Pat. No. 3,215,915. In the illustrated example, for each 0.1 inch movement of the machine element 11, the resolver rotor winding 33 is rotated 360° so that with each such movement of the element the feedback signal C is shifted by 360° relative to the reference signal B. As the machine element 11 continues to move, the feedback signal C is brought into phase with the reference signal B at successive "datum" positions spaced 0.1 inches apart. When the element 11 is moved to the left or to the right of such a datum position, the sense and magnitude of the phase angle $\Phi 2$ (FIGS. 2 a—c) between the midcycle points of the feedback signal C and the reference signal B reflects the sign and extent of the displacement of the element from that datum position. The particular locations of the datum points along the path of travel at which the feedback wave C is in phase with the reference wave B may be adjusted by physically turning the stator of the resolver 17 and then relocking it in place.

The phase relationships just described are illustrated in FIGS. 2a—c. In FIG. 2a the feedback signal C lags the reference wave B by a small angle $\Phi 2a$ indicating that the movable element 11 is on one side, say to the right, of one of the datum points. In FIG. 2b the feedback signal C lags the reference wave B by a larger angle $\Phi 2b$, indicating additional movement of the movable element 11 away from the datum position at which it was it was at the instant for which the waveforms are shown in FIG. 2a.

FIG. 2c illustrates the relative phases of the feedback signal C and the reference wave B when the movable element 11 is on the opposite side of a datum position from that illustrated in FIGS. 2a and 2b. In such a case the feedback signal C leads the reference wave B by an angle $\Phi 2c$.

The command signal F which appears on the conductor *com* may be derived from any suitable source (not shown) such, for example, as shown in detail in applicant's above-identified parent application. It will suffice to understand here that the command signal F is a train of recurring pulses having the same frequency (e.g., 500 hertz) as the reference wave B but which, by their phase $\Phi 1$ relative to the reference wave, represent the commanded position of the movable element 11. As the command pulses F shift in phase relative to the wave B, the extent, direction and rate of the shift represent the commanded displacement, direction and velocity of motion to be imparted to the element 11.

Because the phase angle $\Phi 2$ between the negative-going zero crossings $C_o$ of the feedback signal C and the negative-going crossings $B_o$ of the reference wave B represents the actual displacement of the element 11 from a datum position, and because the phase angle $\Phi 1$ between the command pulses F and the negative-going zero crossings $B_o$ of the reference wave B represents the commanded or desired displacement of the element 11 from the same datum position, it follows that the "position error" is represented by the algebraic difference $\phi_1 - \phi_2$. By reducing that error and holding it substantially at zero, the actual position of the element is kept substantially in agreement with the commanded position as the latter varies.

The phase angle difference $\Phi 1 - \Phi 2$ is called $\Delta \Phi$, then $\Delta \Phi$ is the phase angle of the command pulses measured relative to the feedback wave C. And to control the angle $\Delta \Phi$ so that it is kept substantially at zero even though the command phase angle $\Phi 1$ varies, it is desirable to create a DC error signal corresponding to the value of $\Delta \Phi$ and usable to control the servomotor 13.

In accordance with the invention, the time phased command signal F and the variable phase feedback signal C are caused to operate a single bistate device whose outputs are then used to produce a polarized error signal which is indicative of the magnitude and the sense of the error phase angle $\Delta \Phi$ between the phase command and feedback signals. The bistate device, shown as a flip-flop 63, has two stable states which will be referred to as its "0" and "1" states. The flip-flop 63 is set into its "1" state at the instants when the command pulses F are fed to its "set" input terminal S over the conductor *Com*.

Means are also provided for resetting the flip-flop 63 into its "0" state at the instant of each positive-going zero crossing of the feedback signal C. The positive-going zero crossing signal for resetting the flip-flop is derived from the feedback signal C by means of a square wave shaping circuit 65. At one of its output terminals 64 the square wave shaper 65 produces a first square wave G which is in phase with the feedback signal C. The square wave G is fed to a unipolar differentiating circuit 67 whose output is connected to the reset input terminal R of the flip-flop 63. In response to each positive-going wave front of the square wave G, and hence at the positive-going zero crossings of the feedback signal C, the differentiating circuit 67 produces a triggering pulse which resets the flip-flop. It will be understood, of course, that the application of a pulse to the set or reset terminals S or R when the flip-flop 63 is already in its set or reset state simply leaves it in its existing state.

The flip-flop 63 has a pair of output terminals labeled "1" and "0". When the flip-flop is in its "1" state, the "0" output produces a logic signal which is at the logical "0" level and the "1" output produces a logic signal at the logical "1" level. In the embodiment of the invention illustrated in FIG. 1, the logical "0" level is positive relative to the logical "1" signal level. When the flip-flop is reset into its "0" state, the logic signals at its outputs are reversed with a logical "1" signal appearing at the "0" output and a logical "0" signal appearing at the "1" output.

At a second output terminal 66, the square wave shaper 65 produces a complement of the square wave G, such complement being labeled $\overline{G}$. Thus, at all times, the square wave shaper produces at its two outputs a pair of bivalued logic signals, one signal, $\overline{G}$, being at a relatively low, binary logic "1" level during each positive half cycle of the feedback signal C and at a binary "0" level during each negative half cycle of the feedback signal. The other square wave signal, $G$, is at a low, binary logic "1" level during each negative half cycle and at a binary "0" level during each positive half cycle of the feedback signal (FIG. 2a).

In order to produce a polarized DC signal which is indicative of the sign and magnitude of the error phase angle between the feedback signal C and the compare signal F, the complement output $\overline{G}$ of the square wave shaper 65 and the "1" output H of the flip-flop 63 are applied to a first AND gate 69, and the $G$ output of the square wave shaper 65 and the "0" output $\overline{H}$ of the flip-flop 63 are applied to a second AND gate 71.

The outputs of the AND gates 69 and 71 are connected to control terminals 72 and 74 of two current generators 73 and 75 respectively. The generators work into s common load resistor 77, but are oppositely poled so that when the negative current generator 73 is turned on, current flows from ground through the resistor 77 and through the generator 73 into a negative terminal 79 thus establishing a negative voltage across the resistor. Conversely, when the positive current generator 75 is turned on, current flows from a positive terminal 81 through the generator 75 and the resistor 77 into ground, causing a positive voltage to appear across the resistor. Regardless of which current generator is turned on, the size of the signal across the resistor 77 is kept at a predetermined magnitude by a bipolar Zener diode 83 connected across the resistor.

Thus the two current generator 73 and 75, the resistor 77, and the bipolar Zener diode 83 operate as a single tristate signal generating unit. When the generating unit, generally indicated as 85, is in its first state, both generators 73 and 75 are off and zero voltage appears across the resistor 77. The tristate unit 85 is placed in its second or "positive on" state by turning on the positive current generator 75, establishing a positive signal across the resistor 77. To place the unit 85 in its third, "negative on" state the negative current generator 73 is turned on instead, thus establishing a negative signal across the resistor 77.

As will become clear, the flip-flop 63 together with the AND gate 69 connected as shown to receive the $H$ and $\overline{G}$ signals constitute means for setting the tristate generator 85 to its third state (negative on) in response to a command signal F occurring prior to a negative-going zero crossing in each cycle of the feedback signal, and means for resetting the tristate generator 85 to its first state (zero output) when such zero crossing occurs. This operation occurs when the command phase (command signal F) leads the feedback wave C from the resolver 27. On the other hand, the flip-flop 63 together with the AND gate 71 connected as shown to receive the $G$ and $\overline{H}$ signals constitutes means for setting the tristate generator 85 to its second state (positive on) in response to a negative-going zero crossing of the feedback wave C occurring prior to the command signal F during each cycle of that wave, and for resetting the generator 85 to its first state (zero output) when such command signal occurs. Such action takes place when the command phase (command signal F) lags the actual position phase of the feedback wave C. In either case, the period during which the tristate generator is in its second or third states (positive on or negative on) is proportional to the error phase angle $\Delta\Phi$ between the command phase pulses F and the feedback wave C.

Viewed in a different way, the tristate generator together with the gates 69 and 71 which control it constitute means for producing a first type of error signal (negative voltage across resistor 77) during periods when the flip-flop 63 is in its "1" state and the feedback signal C is concurrently in a positive half cycle; and they also constitute means for producing a second type of error signal (positive voltage across resistor 77) during periods when the flip-flop 63 is in its "0" state and the feedback signal is concurrently in a negative half cycle.

When the command signal F leads the negative-going zero crossing point $C_0$ of the feedback signal C, the first AND gate 69, controlled by the $\overline{G}$ and H signal outputs of the wave shaper 65 and the flip-flop 63, sets the tristate signal generating unit 85 to its "negative on" state so as to produce a negative signal across the resistor 77 for a time interval which is directly proportional to the amount of the phase lead.

Similarly, when the command signal F lags the point $C_0$, the second AND gate 71, under the control of the signals G and $\overline{H}$ sets the signal generating unit 85 to its "positive on" state, again for a time interval directly proportional to the amount of the phase lag.

The manner in which the square wave shaper 65, the flip-flop 63, the AND gates 69 and 71 and the tristate signal generating unit 85 cooperate to produce the bipolar signals just described is best explained with reference to the diagram of the various signals in FIGS. 2a—2c.

Refer first to FIG. 2a which illustrates the command phase signal F occurring in phase with the feedback wave C, i.e., coincidentally with the negative-going zero crossing $C_0$. As the feedback signal C passes through zero in a positive direction, the signal g becomes positive and goes to the binary "0" level. At the same time the flip-flop 63 is reset and its H output signal rises to binary "0" level. Since the signal G is connected to the AND gate 71 and the signal H is connected to the AND gate 69, both gates are closed even though at their other inputs they are enabled by $\overline{G}$ (in case of the AND gate 69) and by $\overline{H}$ (in the case of AND gate 71). When the command phase pulse F appears (lagging the reference wave crossing $B_0$ by an angle $\Phi 1a$) it sets the flip-flop 63, thereby making $H=1$ and $\overline{H}=0$ However, it is assumed that under the conditions illustrated by FIG. 2a that the feedback signal C also lags the reference wave B by an equal angle $\Phi 2a$, i.e., that the commanded instantaneous position of the element 11 equals the actual position so that the command phase angle $\Phi 1a$ and the actual position feedback phase angle $\Phi 2a$ are equal. Under these conditions with no phase error ($\Phi 1a-\Phi 2a=0$), the flip-flop 63 sets in response to a command phase pulse F, the feedback wave C simultaneously begins a negative half cycle, and the output of the square wave shaper 65 makes $G=1$ and $\overline{G}=0$. Thus, neither of the AND gates 69, 71 is opened, and the tristate signal generator 85 remains in its off state. The signal across the resistor 77 remains zero, as indicated at P. So long as the phase error remains zero, this condition will continue.

Assume now that command signal F leads the negative-going zero crossing point $C_0$ of the feedback signal C. FIG. 2b illustrates this condition with $C_0$ lagging a corresponding negative-going zero crossing point $B_0$ of the reference signal B by an angle $\Phi 2b$ and with the command signal F lagging behind the point $B_0$ by a smaller angle $\Phi 1b$ so that the command signal F leads the negative-going zero crossing point $C_0$ of the feedback signal C by $+\Phi 1b-\Phi 2b=-\Delta\Phi b$.

With the command signal F leading the point $C_0$ of the feedback signal C, at some instant before the signal $\overline{G}$ goes to the binary "0" level, the command signal F sets the flip-flop 63 to its "1" state and causes its output signal H, received by AND gate 69, to drop to the binary "1" level. Since the other input $\overline{G}$ of the AND gate 69 is already at binary "1" level, the AND gate opens, and produces a signal I which turns on the negative current generator 73. This represents the third state of the tristate generator 85 in which the generator produces a negative signal K across the resistor 77.

The AND gate 69 remains open and the generator 85 maintains the signal across the resistor 77 so long as the signals $\overline{G}$ and H remain at their binary "1" levels, that is while the feedback signal C is in a positive half cycle and the flip-flop 63 is concurrently in its "1" state. This condition terminates with the negative-going zero crossing $C_0$ of feedback signal C which causes the signal $\overline{G}$ to rise to its binary "0" level.

Thus, with the command signal F leading the negative-going zero crossing point $C_0$ of the feedback signal C, a negative signal, shown in FIG. 2b as the signal K, is generated during a period which begins with the compare signal F and which ends with the negative-going zero crossing of the feedback signal C, that is, while the flip-flop 63 is in its "1" state and the feedback signal C is concurrently in a positive half cycle. As a result, the time interval during which the negative signal K exists during each cycle of the reference wave is directly related to the magnitude of the error phase angle $\Delta\Phi b$.

Let it be assumed next that the command signal F lags behind the same arbitrary point $C_0$ of the feedback signal C. This condition is illustrated in FIG. 2c where the negative-going zero crossing point $C_0$ of the feedback signal C is shown to lead the negative-going zero crossing point $B_0$ of the reference signal B by an angle $\Phi 2c$ and where the command signal is shown to lag the crossing point $B_0$ by an angle $\Phi 1c$. Thus the total phase difference $\Delta\Phi c$ between the point $C_0$ of the feedback signal C and the compare signal F is $\Phi 1c+\Phi 2c$. In other words, the phase error is $\Phi 1-\Phi 2=+\Phi 1c-(-\Phi 2c)=+\Delta\Phi c$, with the command phase lagging the actual position phase.

During the initial portion of the positive half cycle of the feedback signal C, the conditions of the AND gates 69 and 71 are the same as those illustrated in FIG. 2b. That is, the AND gate 69 is closed because the flip-flop output signal H is "0," and the AND gate 71 is closed because the square wave shaper output signal G is "0." With the negative-going zero crossing point $C_0$ of the feedback signal C leading the command signal F by an angle $\Delta\Phi c$, the feedback signal C reverses the binary levels of the square wave shaper output signals G and $\overline{G}$ some time before the occurrence of the command signal F. In particular, at the instant when the feedback signal C crosses zero, the signal G drops to a binary "1" level. Since the flip-flop output signal $\overline{H}$, fed to the other input of the AND gate 71, is already at binary "1" level (the flip-flop 63 having been reset when the feedback signal C went through its positive zero-crossing point) the AND gate 71 is opened. Opening of the AND gate 71 in turn produces a signal J at its output which turns on the positive current generator 75 and creates a positive signal L across the resistor 77.

The AND gate remains open and the generator 75 continues to produce a positive signal across the resistor 77 so long as the signals G and $\overline{H}$ remain at their binary "1" levels, that is, while the feedback signal C is in its negative half cycle and the flip-flop is concurrently in its "0" state. This set of conditions ends with the occurrence of the command signal F which sets the flip-flop 63 into its "1" state causing the signal $\overline{H}$ to return to its binary "0" level, thereby closing the AND gate 71. Thus a positive signal, shown in FIG. 2c as the pulse L is generated during a period which commences with the negative-going zero crossing of the feedback signal C and ends with the occurrence of the compare signal F. It will be observed that the time duration of the signal L corresponds to the magnitude of the phase error $\Delta\Phi c$.

It is noteworthy that the absence of an error signal from the output of the signal generator 85 during the inphase condition is achieved by simply turning off both the negative current generator 73 and the positive current generator 75. As a result, when the command signal F and the negative-going zero crossing point $C_0$ coincide (FIG. 2a), the only signal that will appear across the resistor 77 will be that due to the very slight propagation delay in the flip-flop 63 which may cause it to reverse its state a few nanoseconds after the reversal of the logic levels of the square wave shaper output signals $G$ and $\overline{G}$. This propagation delay may introduce a positive voltage spike of a few nanoseconds duration at the resistor 77 when the feedback signal C passes through its negative-going zero crossing point and similarly a negative voltage spike a few nanoseconds long may appear across the resistor 77 when the feedback signal C passes through its positive-going zero crossing. Aside from the minute propagation-induced voltage spikes which may appear, and which average out to zero, after filtering, the more serious spurious error signal which might be caused by an unbalanced current flow from both of the current generators 79 and 81 during the inphase condition of the compare signal F and the feedback signal C is eliminated.

As the movable element 11 is being translated, the command signal F representing the desired position and rate of change of position of the element 11 will lead or lag the negative-going zero crossing point $C_0$ of the feedback signal C through several cycles, depending upon whether the element is being driven in the $+x$ or $-x$ direction. To convert the variable width, constant amplitude pulses K or L into a smoothly variable control signal, e.g., a polarized variable DC voltage suitable for application to a servoamplifier and thence to the servomotor 13, they are averaged by an integrator 87 which may be simply a low pass filter. The output of the low pass filter 87 is thus a polarized DC signal representative of the sense and magnitude of the average error phase angle $\Delta\Phi$ between the command signal F and the negative-going zero crossing $C_0$ of the feedback signal C over sever cycles. After amplification by the servoamplifier 19, the DC error signal is applied to the servomotor 13 causing it to drive the movable element 11 in a direction and at a velocity which conforms with the direction and rate of change in the phase of the command pulse F, that is, in a sense and at a rate directed by the contouring director 41. It will be understood that as soon as the phase angle of the command phase pulse F begins to change, and the error phase angle departs from zero, the servomotor 13 begins to move, so that the phase of the feedback signal C is shifted by the resolver 27 in a direction to restore the error phase angle to zero. Thus, the instantaneous position error cannot exceed 0.05 inch and the single fine resolver 27 is sufficient to keep the system tracking the dynamically changing directed position.

In the foregoing description certain assumptions have been made and the system described on the basis of these assumptions for sake of simplicity. Some of these assumptions are arbitrary, and it will be understood that circuit connections or signal polarities be reversed and the system operation modified accordingly without departing from the invention. For example, the flip-flop 63 has been described as being reset at the instant of positive-going zero crossing by the feedback signal C and set in response to the command signal F. Yet it is apparent that the phase error signaling system would be equally effective if the flip-flop were set, instead of reset, at the positive-going zero crossing of the feedback signal C and reset, instead of set, in response to the command signal signal F. To compensate for the resulting reversal in the logic levels of the flip-flop output signals, the connections of the flip-flop output terminals "1" and "0" would also be reversed so as to apply the signal $H$ to the AND gate 71 and the signal $\overline{H}$ to the AND gate 69.

Further, if only the feedback wave C were reversed in phase by 180° relative to that shown in FIGS. 2a—c (for example, by reversing the input connections to the resolver winding 33), the zero phase error condition would obtain when the command phase pulses F coincide with the positive-going zero crossings (rather than negative-going crossings) of the feedback wave C. Such reversal could be compensated for by merely reversing the connections from the G and $\overline{G}$ outputs of the square wave shaper. This illustrates the fact that negative or positive-going zero crossings may be used as reference instants, this being a matter of choice.

While in certain ones of the claims appended hereto, reference has been made to specific polarities, positive or negative zero crossings, and setting or resetting of a bistate device in the interest of clarity and understandability, it is intended that the claims be construed to embrace the obviously equivalent reversals of the nature described above.

I claim:

1. In a system for producing a control signal which varies according to the sense and extent of the phase displacement between variable phase recurring command pulses and the negative-going zero crossing of a regularly recurring variable phase signal, the combination comprising
  a. a bistate device having stable "0" and "1" states,
  b. means for setting said bistate device to its "1" state in response to each of said command pulses,
  c. means for resetting said bistate device to its "0" state in response to each positive-going zero crossing of said recurring signal,
  d. means for producing a first signal having a first predetermined value during those periods when said bistate device is in its "1" state and said recurring signal is concurrently in a positive half cycle,
  e. means for producing a second signal having a predetermined value during those periods when said bistate device is in its "0" state and said recurring signal is concurrently in a negative half cycle,
  f. said first and second signals thereby being modulated in width and occurring exclusively of one another, and
  g. means for producing a smoothly varying control signal corresponding to the average value of that one of the first and second signals which is occurring.

2. In a system for producing a control signal which varies according to the sense and extent of phase displacement between successive time-phased command pulses and successive negative-going zero crossings of a cyclically recurring signal, the combination comprising
  a. a bistate device having stable "0" and "1" states,
  b. means for setting said bistate device to its "1" state in response to each of said command pulses,
  c. means for resetting said bistate device to its "0" state in response to each positive-going zero crossing of said recurring signal,
  d. positive and negative constant magnitude signal generating means settable to off, positive on, and negative on states,
  e. means for causing said generating means to produce a negative output signal during those periods when said bistate device is in its "1" state and said recurring signal is concurrently in a positive half cycle,
  f. means for causing said generating means to produce a positive output signal during those periods when said bistate device is in its "0" state and said recurring signal is concurrently in a negative half cycle, and
  g. means for filtering the output signals of said generating means to produce a smoothed, variable control signal.

3. In a system for signalling the sense and extent of phase angle between successive time-phased command pulses and successive negative-going zero crossings of a regularly recurring alternating signal, said system comprising in combination
  a. tristate means for generating an output signal which is (1) zero, (2) positive, or (3) negative with the same magnitude when set to its first, second, or third states,
  b. means for setting said generating means to its third state in response to a command pulse occurring prior to a negative-going zero crossing during each cycle of said recurring signal and resetting said generating means to its first state when such zero crossing occurs,
  c. means for setting said generating means to its second state in response to a negative-going zero crossing of said recurring signal occurring prior to a command pulse during each cycle of said recurring signal and for resetting said generating means to its first state when such command pulse occurs, and d. low pass filter means for producing a control signal which varies in magnitude and polarity according to the average value of said output signal.

4. In a system for signalling the sense and extent of phase angle between time-phased command pulses and the negative-going zero crossing of a regularly recurring alternating signal, the combination comprising a. a flip-flop having first and second stable states and means for producing a pair of mutually complementary signals indicative of the prevailing state of said flip-flop, b. means for setting said flip-flop to its second state in response to each of said command pulses, c. means for resetting said flip-flop to its first state in response to each positive-going zero crossing of said recurring signal, d. means connected to receive said recurring signal for generating a square wave signal and its complement respectively in phase with and 180° out of phase with said recurring signal, e. means including a first AND gate connected to receive said square wave signal and one output signal of said flip-flop for producing a signal of a first polarity during those periods when said flip-flop is in its second state and said recurring signal is concurrently in a positive half cycle.

f. means including a second AND gate connected to receive said square wave complement and the other output signal of said flip-flop for producing a signal of a second polarity during those periods when said flip-flop is in its first state and said recurring signal is concurrently in a negative half cycle, g. said first and second signals being time-width modulated according to the extent of the phase angle and occurring respectively when the phase error is of one sense or the other, and h. means for producing a control signal which smoothly varies according to the average value of the first and second polarity signals.